No. 765,220.

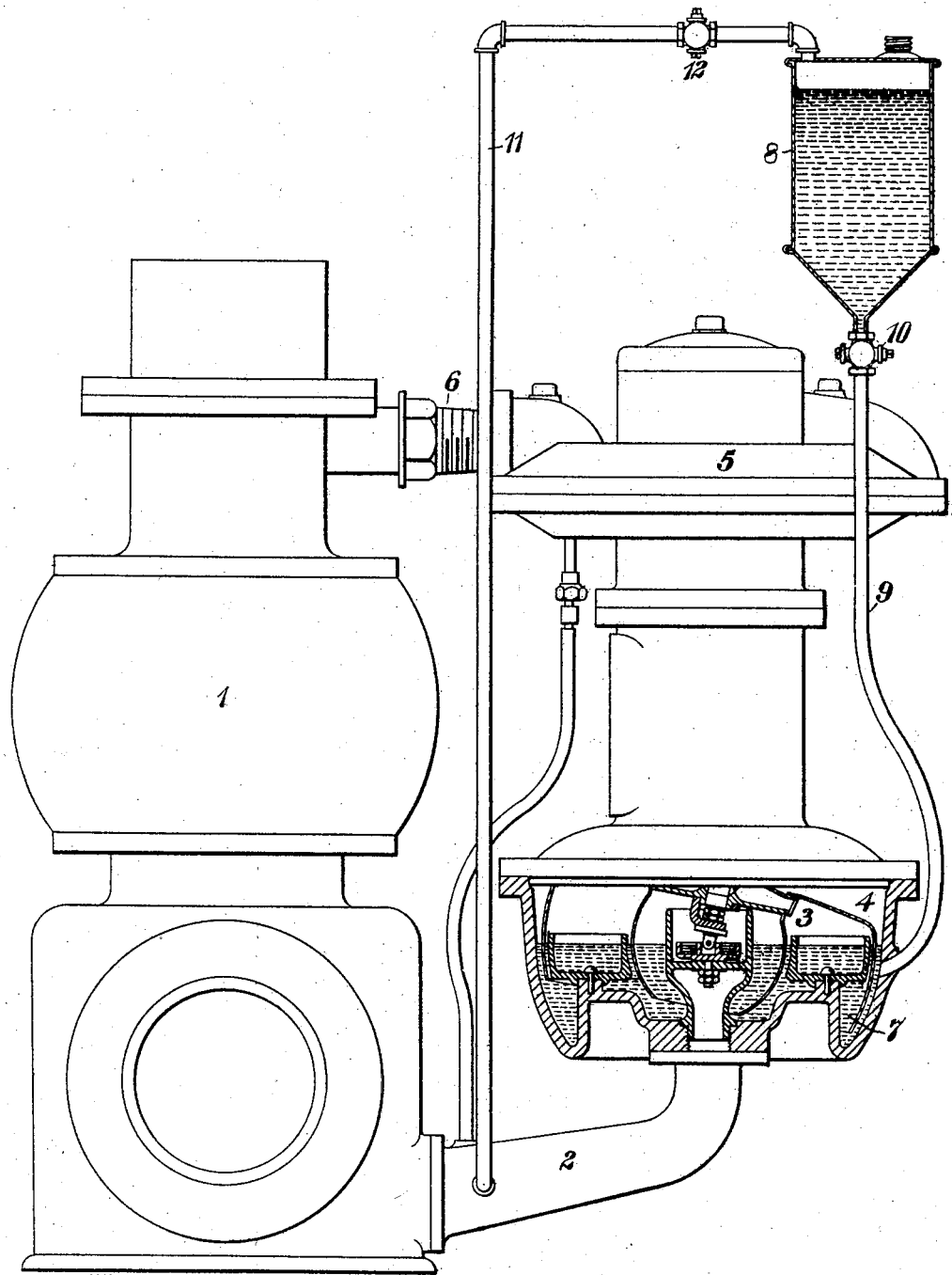

Patented July 19, 1904.

UNITED STATES PATENT OFFICE.

XAVIER WITTMER, OF PITTSBURG, PENNSYLVANIA, ASSIGNOR TO PITTSBURG METER COMPANY, A CORPORATION OF PENNSYLVANIA.

GAS-METER.

SPECIFICATION forming part of Letters Patent No. 765,220, dated July 19, 1904.

Application filed November 7, 1901. Serial No. 81,481. (No model.)

*To all whom it may concern:*

Be it known that I, XAVIER WITTMER, a citizen of the United States, residing at Pittsburg, in the county of Allegheny and State of Pennsylvania, have invented new and useful Improvements in Gas-Meters, of which the following is a specification.

My invention relates to gas-meters of the type known as "fluid" or "wet" meters, in which a sealing liquid is employed in connection with the measuring piston or shell; and it has for its object to provide a simple, efficient, and easily-controlled means for supplying the sealing liquid to the meter case or chamber without stopping or interfering with the operation of the meter.

My invention is illustrated in the accompanying drawing, the single figure of which is a view, partially in side elevation and partially in section, of a proportional meter provided with my invention.

While I have shown the invention as applied to a proportional meter, it is not intended thereby to restrict its application to meters of this class, since the invention is equally applicable to meters in which all of the gas supplied to the consumer passes through the measuring-chamber.

The tally-meter that is here shown as provided with my improvement is of the general type set forth in Patent No. 400,420, granted to George Westinghouse, Jr., and Chauncy N. Dutton on the 26th day of March, 1899, which may be referred to for such information respecting the structure and operation as is not here given, provided additional information is desired. As a matter of fact, however, the invention is in no way restricted to any specific form or type of wet meter, since it is equally well adapted for supplying sealing liquid to all forms of wet gas-meters known.

It is well understood in the art that sealing liquids are sometimes employed in wet meters which evaporate to a greater or less extent and that the seal is sometimes blown by reason of extreme variations in gas-pressure, thus necessitating a fresh supply of sealing liquid. So far as I am aware, it has been necessary prior to my present invention to stop the operation of the meter in order to add a further supply of sealing liquid to the meter case or chamber. By employing my invention the desired amount of liquid may be added at any time without interfering with the operation of the meter and without disturbing any of its parts.

In the apparatus shown in the drawing the main body of gas flows through the casing 1, which may contain the usual valves and coöperating devices. The portion of the gas to be measured passes through the pipe 2, the measuring piston or shell 3, and the chamber 4 of the tally-meter, the diaphragm-chamber 5, and the pipe 6 to join the main body of gas which passes through the casing 1.

As has already been stated, the piston or shell 3, which operates in the case or chamber 4, may be of any construction or mode of operation suitable for imparting to the registering mechanism (not shown) such movement as will cause it to register the amount of gas flowing through the meter.

The sealing fluid 7 in the chamber 4 is supplied thereto from a suitable receptacle 8, located at a materially-higher level than the tally-meter and connected thereto by means of a pipe 9, having a cock 10. The upper end of the receptacle 8 is connected to the pipe 2 by means of a pipe 11, having a cock 12. It will be understood that the pipe 11 may connect the upper portion of the receptacle 8 with some other portion of the apparatus, in which the fluid-pressure is such as to approximately balance or slightly exceed that in the case or chamber 4, if desired. Since the gas-pressure in the tally-meter above the sealing liquid is approximately equal to that in the pipe 2, the liquid in the receptacle 8, the pipe 9, and the chamber 4 constitutes, in effect, a single body when the cock 10 is open, and such body of liquid is subjected to a balanced fluid-pressure, provided, of course, that the cock 12 is also open. Such being the case, gravity will serve to effect a comparatively slow movement of the liquid from the receptacle 8 to the case or chamber 4, which may be regulated by adjusting one or both of the cocks 10 and 12. When the desired amount of liquid has been transferred to the chamber 4, the cocks 10 and 12 may be closed. It will thus be seen that the quantity of sealing liquid in the case or chamber 4 may be reinforced at any time by merely opening the cocks 10 and 12 and that when the desired amount of liquid has been introduced into the chamber 4 the cocks 10 and 12 may be closed, all without stopping or in any way interfering with the operation of the meter.

I claim as my invention—

1. The combination with a gas-meter having a measuring piston or shell operating in a sealing liquid, of a closed receptacle containing a liquid and located above the level of the meter case or chamber, a valved pipe connection between the liquid in the receptacle and the case or chamber and a valved pipe connection between the upper end of the receptacle and a portion of the apparatus having approximately the same fluid-pressure as that existing in the case or chamber.

2. The combination with a wet gas-meter, of a closed receptacle containing liquid and located at a higher level than the meter and valved pipe connections between the respective ends of the same and the inlet and outlet sides of the meter, whereby the liquid may be supplied to the meter case or chamber in regulated quantities while the meter is in operation.

3. The combination with a wet gas-meter, of a closed receptacle containing liquid and located at a higher level than the meter, a valved pipe connection between the bottom of the receptacle and the meter case or chamber and a valved pipe connection between the top of the receptacle and the meter-inlet, whereby the liquid may be supplied to the case or chamber while the meter is in operation.

In testimony whereof I have hereunto subscribed my name this 1st day of November, 1901.

XAVIER WITTMER.

Witnesses:
   ALEX. A. PATTERSON,
   GEO. X. WITTMER.